United States Patent Office 3,408,219
Patented Oct. 29, 1968

3,408,219
NON-DRYING POLYEPOXIDE ESTER RESIN BASED TRAFFIC PAINTS
Dennis Neal, Convent Station, and John A. Lopez, Springfield, N.J., assignors to Shell Oil Company, New York, N.Y., a corporation of Delaware
No Drawing. Filed Apr. 9, 1965, Ser. No. 447,086
6 Claims. (Cl. 117—37)

ABSTRACT OF THE DISCLOSURE

Markings on highways which are wear and weather resistant are obtained by cleaning the surface and applying a composition comprising an inert organic solvent, pigment and a non-drying polyepoxide ester prepared by esterifying a glycidyl polyether of a polyhydric phenol with long-chain, saturated monocarboxylic acid.

---

This invention relates to rapid-drying coating compositions of outstanding durability. More particularly, the invention relates to traffic paints suitable for highway applications which are based on a non-drying polyepoxide ester resin.

Specifically, the invention provides rapid-drying traffic paints which retain their toughness and abrasion resistance comprising a non-drying polyepoxide ester resin formed by esterifying a polyepoxide, and, particularly a solid grade glycidyl polyether of a polyhydric phenol, with a long chain saturated monocarboxylic acid, such as lauric acid.

There is a growing need for highway or traffic paints which will dry rapidly, not age-harden, crack, and peel off. Traffic paints which have good adhesion, i.e., will not be picked up by traffic, and which have good durability are also needed. Conventional traffic paints now in use are based on drying oil alkyds. The drying oil alkyd resins used in alkyd resin based paints are an oxidizing alkyd comprising, for example, phthalic anhydride and glycerin modified with a drying oil. The drying oil alkyd based paints to which a solvent, such as naphtha or white spirits, has been added are applied to highway surfaces as a liquid. The solvent is released by evaporation and then the unsaturated fatty acid chains of the resin molecule readily absorbs oxygen from the air and dry the resin to form a tough film. Thus, the drying rate in the drying oil alkyd resins is a function of oxidative polymerization, as well as solvent release. The oxidation, however, continues and the film becomes progressively harder resulting in embrittlement and reduction of abrasive resistance thereof causing the film to crack and peel off.

Accordingly, it is an object of this invention to provide rapid drying traffic paints which have good adhesion, do not age-harden, are not picked up by traffic and which retain their toughness and abrasive resistance and which have outstanding durability, i.e., wearing and weathering resistance. These and other objects and advantages will be apparent from the following description and disclosure.

It has now been found that these and other objects are accomplished by the paint compositions of the present invention which comprises the following components:
(1) A non-drying polyepoxide ester resin, and particularly a solid grade glycidyl polyether of a polyhydric alcohol esterified with a long chain saturated monocarboxylic acid;
(2) A solvent; and
(3) A pigment.

The paint compositions of the present invention are particularly suitable for traffic paint applications. Heretofore, it was believed necessary in formulating traffic paint compositions to employ resins modified with drying oils in order to obtain a hard dry coating which would not be picked up by traffic and stick to tires. The paint compositions of the present invention, however, employ resins modified with non-drying oils. These paint compositions are applied to the highway surface, and the solvent then evaporates leaving a tough film on the highway surface which is not picked up by traffic. The paints of the present invention dry by solvent evaporation and, therefore, the initial molecular structure of the resin remains substantially unchanged during its life, i.e., the resin does not absorb oxygen and age-harden as do drying oil resins. Consequently, the traffic paints of this invention do not suffer from the inherent shortcomings of the drying oil alkyd based traffic paints. Furthermore, the paint compositions of the present invention dry much more rapidly than the drying oil alkyd compositions since the drying rate of the present compositions is a function of solvent release rather than the customary mechanism of oxidative polymerization.

NON-DRYING POLYEPOXIDE ESTER RESIN COMPONENT

The non-drying polyepoxide ester resin component of the traffic paint compositions of the present invention are obtainable by reacting an esterifiable aromatic polyether with a long-chain saturated monocarboxylic acid.

The esterifiable aromatic polyethers are obtainable by reacting a polyhydric phenol with epichlorohydrin or dichlorohydrin and sufficient alkali to combine with the released hydrogen chloride. The polyethers of a dihydric phenol are particularly preferred. These polyethers have a chemical structure wherein the glycidyl radicals from the epichlorohydrin or dichlorohydrin and the divalent aromatic hydrocarbon radicals from the dihydric phenol are present as a chain with the two types of radicals alternating and being joined into the chain by ethereal oxygen atoms. The terminal groups of the chain in the polyethers may contain 1,2-epoxy groups due to the presence of a glycidyl radical thereat although some of the terminal groups may be dihydroxyl-glycerol radicals resulting from hydration of the glycidyl radical.

The 1,2-epoxy equivalency of the glycidyl polyethers of a polyhydric phenol employed in the ester component is a value greater than 1.0, the 1.2-epoxy equivalency being the number of epoxy groups

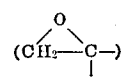

contained in the average molecule of the polyether. In the case of glycidyl polyethers of a dihydric phenol, the 1,2-epoxy equivalency is normally between 1.2 and 2.0.

The simplest of the polyethers are diglycidyl diethers of dihydric phenols which contain a single divalent aromatic hydrocarbon radical from the dihydric phenol and have two glycidyl radicals linked thereto by ethereal oxygen atoms. More generally, the polyether is of resinous character and contains two or more aromatic hydrocarbon radicals alternating with glyceryl groups which are connected therewith through ether oxygen atoms. Ordinarily, the polyether is a complex mixture of compounds rather than being a single particular compound. The principal product may be represented by the formula

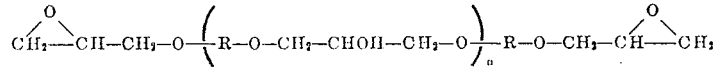

wherein $n$ is an integer of the series, 0, 1, 2, 3 . . ., and R represents the divalent hydrocarbon radical of the dihydric phenol. While for any single molecule, $n$ will be an integer, the fact that the polyether is a mixture of compounds causes the determined value of $n$, e.g., from molecular weight measurement, to be an average which is not necessarily zero or a whole number. Although the polyether is a substance primarily of the above formula, it may contain some material with one or both of the terminal glycidyl radicals in hydrated form.

The esterifiable groups contained in the polyethers are attached to the glyceryl radicals $(-CH_2-CH-CH_2-)$ 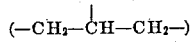

therein. These esterifiable groups are epoxy groups and alcoholic hydroxyl groups, both of which are attached to the glyceryl radicals. Upon reaction of the polyethers with the unsaturated fatty acids, both of these esterifiable groups form ester linkages to the glyceryl radicals by joinder thereto of acyloxy groups. While $n$ is ordinarily a value from 0 to about 12 in the polyethers, it is generally preferred to employ in the compositions esters from polyethers wherein $n$ is about 2 to 12.

Any of the various dihydric phenols is used in preparing the esterifiable polyethers, including mononuclear phenols such as resorcinol, catechol, hydroquinone, methyl resorcinol, etc.; or polynuclear phenols like 2,2-bis(4-hydroxyphenyl)propane (bis - phenol), 4,4'-dihydroxybenzophenone, bis (4-hydroxyphenyl)methane, 1,1-bis(4-hydroxyphenyl)ethane, 1,1 - bis(4-hydroxyphenyl) isobutane, 2,2-bis(4-hydroxyphenyl)butane, 2,2-bis(4-hydroxy-2-methylphenyl)propane, 2,2-bis(4-hydroxy-2-tertiarybutylphenyl)propane, 2,2 - bis(2 - hydroxynaphthyl) pentane, 1,5-dihydroxynaphthalene, etc.

More specifically, the esterifiable polyethers are prepared, in general, by heating at about 50° C. to 200° C. the dihydric phenol with epichlorohydrin in a basic reaction medium. Depending upon the type of product desired, there is used from more than 1 to 2 or more moles of epichlorohydrin per mol of dihydric phenol. Also present is a base, such as sodium hydroxide, generally in amount of about 5% to 30% stoichiometric excess of the epichlorohydrin, i.e., 1.05 to 1.3 equivalents of base per mol of epichlorohydrin. In effecting the reaction, the dihydric phenol is mixed with an aqueous solution of the base and heated. The epichlorohydrin is then added rapidly to the stirred reaction mass. The initial reaction is somewhat exothermic so that a temperature rise occurs to some extent. After addition of the epichlorohydrin, heating is applied for several hours while stirring in order to complete the reaction. While still in molten state, the formed polyether is washed with water until free of base, and then heated to remove water.

The higher solid glycidyl polyethers of polyhydric phenols of constituent (a) are conveniently prepared by first preparing a lower molecular weight polyether and then reacting that polyether with additional polyhydric phenol.

Polyether A.—Into a reaction vessel fitted with a stirrer, 1 mol of 2,2-bis-(4-hydroxyphenyl)propane, referred to as (bis-phenol), and 1.88 mols of sodium hydroxide as a 10% aqueous solution are introduced and heated to about 45° C. whereupon 1.57 mols of epichlorohydrin are added rapidly while agitating the mixture. The temperature is then adjusted so that the mixture is heated at about 100° C. to 105° C. for about 80 minutes. The mixture separates into a two-phase system and the aqueous layer is decanted. The product is then washed with hot water until neutral to litmus whereupon the resulting polyether is drained and dehydrated by heating at about 150° C.

The polyether has a softening point of about 71° C. (Durrans' mercury method). The molecular weight is 900 measured ebullioscopically in ethylene dichloride (average $n=2$). The equivalent weight of esterification is 145, which value is the grams of polyether that will esterify and combine completely with one gram molecule of fatty acid. This value is obtained by heating a sample of the polyether with about twice the theoretical amount of higher fatty acid necessary to react with all of the hydroxyl and epoxy groups, the higher fatty acid being Armour's Neofat No. 3 consisting of about 50% linoleic acid, 40% oleic acid, and 10% stearic acid. The heating is effected at about 230° C. until a constant acid value is obtained. This may require 10 hours heating. By back titrating the unreacted fatty acid with base, a measure is obtained from which the equivalent weight to esterification is calculated. The polyether also has an epoxide equivalent of from 450 to 522 which is the grams of resin containing one gram-equivalent of epoxide; an epoxy value of 0.103 equivalent per 100 grams and a hydroxyl value of 0.28 equivalent per 100 grams of resin. The 1,2-epoxy equivalency is, therefore, 1.8.

Polyether B.—This glycidyl polyether of higher molecular weight is prepared in a like manner to that of Polyether A except that for each mole of bisphenol there is employed 1.22 moles of epichlorohydrin and 1.37 moles of sodium hydroxide. The resulting product has a melting point of 90° C., a molecular weight of 1400 and an epoxide equivalent of from 872 to 1025.

In like manner, other polyethers of bis-phenol or of other dihydric phenols may be prepared which will have different molecular weights and values for $n$ depending upon the molar ratio of epichlorohydrin to dihydric phenol used in preparation thereof.

Polyethers C and D.—The still higher molecular weight polyethers are obtainable by reacting Polyether B with an additional quantity of dihydric phenol. For example, a preferred polyether designated as Polyether C, having a softening point of about 130° C., a molecular weight of about 2900 and an equivalent weight to esterification of 190 is obtained by reacting Polyether B with an added 5% of bis-phenol. This reaction is effected by heating the polyether to 150° C., and then adding the bis-phenol. The heating is continued for about two hours while stirring the reaction mass and gradually increasing the temperature to about 190° C. Polyether D is prepared in the same manner as Polyether C except Polyether B is reacted with an added 7.75% of bis-phenol. Polyether D has a softening point of about 156° C. and an average molecular weight of about 3750.

The preferred esterifiable polyethers are the solid grade glycidyl ethers of polyhydric phenols, and particularly preferred are the polyethers prepared from epichlorohydrin and 2,2-bis(4-hydroxyphenyl)-propane having a molecular weight of about 1400 or more, and of these Polyether C is preferred. Polyether C has a melting point of about 128–133° C.; molecular weight of about 2900; an epoxy value of 0.03; an hydroxy value of 0.36; and an ester value of 0.50.

The long chain saturated monocarboxylic acids used in preparing the ester resins include saturated monocarboxylic acids having from 8 to 22 carbon atoms in its molecule and may be represented by the formula $C_nH_{2n}O_2$. Examples of these acids include caprylic, capric, undecanoic, lauric, tridecanoic, myristic, palmitic, stearic, arochidic and behenic acids. The preferred acid is lauric acid.

If desired, esters of the saturated monocarboxylic acid may be used in place of the corresponding acid in forming the polyepoxide ester resin, e.g., methyl laurate in place of lauric acid. The reaction between the polyepoxide and ester is an exchange reaction, whereby, for example, a hydroxyl group of the polyepoxide is exchanged for the laurate radical of methyl laurate, forming polyepoxide ester and methyl alcohol. The reaction may be conducted in the presence of either an acid or basic catalyst.

The non-drying polyepoxide ester resins may be prepared, for example, by heating in a closed kettle at a temperature of from about 200° to 300° C., and preferably 250° to 275° C., a mixture comprising the above-described esterifiable polyether and from about 10% to 90%, and preferably 40% to 80% of the amount of saturated carboxylic acid required to esterify completely the polyether. Owing to the much greater reactivity of epoxy groups than alcoholic hydroxy groups with free saturated monocarboxylic acids, the epoxy groups are converted first to ester groups by an addition reaction wherein a molecule of acid combines with an epoxy group to give a terminal glyceryl radical having an acyloxy radical and an alcoholic hydroxyl group linked thereto. Continuation of the esterification causes the remaining free acid to esterify part of these formed alcoholic hydroxyl groups as well as alcoholic hydroxyl groups initially present in the polyester. The esterification is continued until substantially all of the acid in the reaction mixture is esterified as evidenced by reduction in the acid number to less than 10, preferably to less than 5, and often to about 1 or less.

The preferred polyepoxide ester resin for use in the paint compositions of this invention is that prepared from esterification of Polyether C (described hereinbefore) with lauric acid. To produce Polyether C 50% esterified with lauric acid the reaction mixture comprises 66% by weight of Polyether C and 34% by weight of lauric acid, and to produce Polyether C 80% esterified with lauric acid the reaction mixture comprises 55.3% by weight of Polyether C and 44.7% by weight of lauric acid.

Preparation of Polyether C 50% Esterified With Lauric Acid

A mixture of 66 parts by weight of Polyether C and 34 parts by weight of lauric acid are charged into a closed kettle equipped with a stirrer and containing an atmosphere of nitrogen. The kettle is heated to a temperature of about 260° C., the stirrer being put into operation after the kettle has reached a temperature of about 135° C. The water of reaction is expelled through a condenser as it is formed by sparging the reaction mixture with a slow stream of nitrogen. Samples are withdrawn periodically for determination of acid number. The heating is continued until an acid number of 5 is reached. The heating is then discontinued, and after the product has cooled to a temperature of about 100° C., xylene is added in an amount to provide a solution containing approximately 50% by weight of xylene.

Polyether C, 80% esterified with lauric acid, is prepared by the above procedure wherein 55.3 parts of Polyether C and 44.7 parts of lauric acid are employed in place of 55 parts and 34 parts, respectively.

SOLVENT COMPONENT

A suitable solvent component of the traffic paint compositions of the present invention includes ketones such as acetone and methyl ethyl ketone, alcohols, glycol ethers, toluene, xylene, benzene, mineral spirits, naphthas and other aromatic petroleum distillates. The solvent component usually consists of a mixture of two or more of the above compounds. The ratio of solvent to resin component may be varied widely depending upon the chosen method of applying the traffic paint to the highway surface, i.e., spraying, brushing, rolling, etc. Spraying is the usual method of applying the traffic paint to the highway surface. The concentration in this instance is usually a volume ratio of about 50:50, but in some situations may vary from 70:30 to 30:70, solvent to polyepoxide ester resin.

PIGMENT COMPONENT

The third and final component of the paint compositions of the present invention is the pigment. The pigment component usually contains a mixture of pigments. Any of the standard pigments which are used in conventional traffic paints are suitable for use in the paint compositions of this invention. Such pigments include, for example: 100% titanium dioxide; 30% titanium dioxide—70% calcium sulfate mixture; a mixture of calcium carbonate and magnesium carbonate; diatomaceous silicas, treated and untreated clays, calcium sulfate, zinc oxide, mica, magnesium silicate and titanium calcium among others. The concentration of the pigment in the paint compositions; expressed as percent pigment volume concentration, varies from about 40:60 to 60:40 and preferably from 45 to 55. The term "percent pigment volume concentration" has reference to that volume portion of the paint, excluding the solvent which is pigment, e.g., a composition comprising ⅓ resin, ⅓ solvent and ⅓ pigment by volume would have a percent pigment volume concentration of 50.

In terms of the total paint composition the concentration of the ester resin component may range from about 10% to 30% by volume, the concentration of the solvent components may range from about 40% to 80% by volume and the concentration of the pigment component may range from about 10% to 30% by volume, the sum of the three components totaling 100%.

The pigment is added to the solvent-resin composition known more commonly as vehicle and blended therewith to obtain a homogeneous paint composition. Any suitable means of blending may be employed. The resulting traffic paint composition is applied to the highway surface, for example by spraying. The vehicle evaporates from the composition leaving a tough film on the surface which has excellent wear and weather resistances.

The traffic paint compositions of the present invention are one-package systems and may be applied to highway surfaces by techniques presently employed in applying conventional traffic paints.

The following examples illustrate the preparation and use of the present paint compositions and compares the compositions with conventional alkyd resin based traffic paints.

The following example is for purposes of illustration and is in no way intended to limit the invention to the particular compositions illustrated.

EXAMPLE I

Preparation of a traffic paint composition consisting of (1) Polyether C 50% esterified with lauric acid, (2) xylene and (3) pigment.

Polyether C 50% esterified with lauric acid according to the procedure setforth hereinbefore is prepared and placed in a drum equipped with a stirrer. An amount of xylene is added thereto to obtain a solution thereof which consists of about 50% by weight of xylene. Pigment consisting of titanium dioxide, magnesium silicate, calcium carbonate, diatomaceous silica is added during constant stirring in the amount required to produce a composition having a 50% pigment volume concentration. The stirring is continued for approximately 15 minutes to obtain a loose mix or premix. The premix is then processed further to obtain complete pigment dispersion within the resin-solvent or vehicle portion of the paint. This can be readily accomplished by milling, grinding, or high shear mixing. Satisfactory dispersion is obtained by further processing the premix on a three roll mill which effects complete breakdown of the pigment agglomerates and thoroughly mixes the composition. The resulting homogeneous paint composition has a white color. For purposes of convenience, this composition is designated as "A–50."

Another batch is prepared according to the above procedure except that the amount of pigment employed is increased an amount to obtain a composition having a 55 percent pigment volume concentration. For purposes of convenience, this composition is designated as "A–55."

Table I gives data of comparative results obtained when the traffic paint compositions "A–50" and "A–55" and conventional alkyd resin based paints were applied to highway surfaces. The condition of the paint on the surfaces was observed at the end of 2½ and 6 month periods. It can be seen from Table I that the paint compositions of the present invention have less "percent film loss" than the alkyd resin base paints tested.

Table II sets forth the properties of the drying-oil alkyd resin paint compositions used in Example I.

TABLE I

| System | Percent Pigment Volume Concentration | Percent Film Loss | | | |
|---|---|---|---|---|---|
| | | 2½ mo. Rt. 40W [1] | | Rt. 1 [2] (concrete) | |
| | | Asphalt | Concrete | 2½ mo. | 6 mo. |
| Composition A-50 | 50 | 10 | 0 | 0 | 10 |
| Composition A-55 | 55 | 15 | 0-trace | trace | 5 |
| Maryland Spec. 1962 | 58 | 15 | trace | 5 | 10 |
| Pennsylvania Spec. 1962 | 53 | | | 20 | 35 |
| New Jersey Spec. 1961, Type III | 55 | | | 5 | 15 |

[1] Route 40W, between Baltimore and Frederick, Maryland.
[2] Route 1, near Newark Airport, Newark, New Jersey.

TABLE II.—ALKYD RESIN PROPERTIES

| Vehicle | Maryland 1962 | | Pennsylvania 1962 | | New Jersey 1961 Type III |
|---|---|---|---|---|---|
| | min. | max. | min. | max. | |
| Alkyd resin solution (50% NV), percent | 83.0 | 85.0 | 83.0 | 85.0 | |
| Petroleum thinner, dries and anti-skinning agent, percent | | 17.0 | | 17.0 | |
| Alkyd resin solution (60% w.), percent | | | | | 80 |
| Chlorinated rubber solution (40% w.), percent | | | | | 20 |

| Alkyd Resin: | min. | max. | min. | max. | min. | max. |
|---|---|---|---|---|---|---|
| Solids content (by wt.), percent | 49.5 | 50.5 | 49.0 | | 60 | |
| Solvent | V.M. and P. Naphtha | | V.M. and P. Naphtha | | Toluene | |
| Color (Gardner) | | 8 | | 9 | | 6 |
| Acid Number (total vehicle) | | 14 | | 7 | | |
| Viscosity (Gardner-Holdt) | N-P | | J-N | | | |
| Wt. per gallon at 77° F. (pounds) | 7.5 | | 7.45 | | | |
| Aliphatic solvent tolerance | 100 to 1 | | 100 to 1 | | | |
| Alkyd Resin Solids Composition: | | | | | | |
| Phthalic anhydride, percent | 35.0 | | 34.0 | | 30.0 | |
| Fatty acids | 48.0 | | 48.0 | 53.0 | 54.0 | |
| Iodine number of Fatty Acids | 115 | 130 | 115 | 130 | 115 | 130 |
| Rosin and derivatives | | none | | none | | none |
| Natural resins | | none | | none | | |
| Other synthetic resins | | none | | none | | |
| Chlorinated Rubber Composition: | | | | | | |
| Chlorine, percent | | | | | 66 | 69 |
| Color Gardner (20% w. in toluene) | | | | | | 4 |
| Viscosity (cps.) (20% w. in toluene) | | | | | 9 | 25 |
| Chlorinated Rubber Solution (by weight): | | | | | | |
| Chlorinated rubber (10 or 20 cps. type) | | | | | 40 | |
| Propylene oxide or Epichlorohydrin | | | | | 0.8 | |
| Benzene | | | | | 60 | |

[1] Resin solution only.

EXAMPLE II

This example describes the preparation of a paint composition comprising Polyether C 80% esterified with lauric acid.

A mixture of 55.3 parts by weight of Polyether C and 44.7 parts by weight of lauric acid are charged into a closed kettle equipped with a stirrer and containing an atmosphere of nitrogen. The kettle is heated to a temperature of about 260° C., the stirrer being put into operation after the temperature inside the kettle has reached a temperature of about 135° C. The water of reaction is expelled through a condenser as it is formed by sparging the reaction mixture with a slow stream of nitrogen. Samples are withdrawn periodically for determination of acid number. When an acid number of 9.0 is reached, the heating is discontinued, and when the temperature of the kettle and product have cooled to approximately 100° C., xylene is added in an amount to provide a solution containing about 50% by weight of xylene.

The solution is then placed into a drum and the procedure of Example I pertaining to the pigmentation is followed.

EXAMPLES III TO V

Traffic paint compositions were prepared according to the procedure of Example I except that an equivalent amount of Polyether A, Polyether B, or Polyether D were used in each of the Examples III-V, respectively. Similar results were obtained.

We claim as our invention:
1. In a method of applying a traffic paint marking to an asphalt or concrete highway surface, the improvement which comprises the application of a paint composition comprising from about 40% to 80% by volume of an inert organic solvent, from about 10% to 30% by volume of a pigment and from about 10% to 30% by volume of a non-drying polyepoxide ester resin wherein said resin comprises a glycidyl polyether of a polyhydric phenol esterified with a long-chain saturated monocarboxylic acid and wherein the pigment volume concentration of the paint composition is between about 40% and 60%.

2. A method as in claim 1 wherein the acid is lauric acid.

3. A method as in claim 1 wherein said polyether is from about 40% to 80% esterified with said acid.

4. A method as in claim 1 wherein said polyether is the reaction product of epichlorohydrin and 2,2-bis(4-hydroxyphenyl)propane.

5. A method as in claim 4 wherein said polyether has a molecular weight of about 2900.

6. A method as in claim 4 wherein said polyether has a molecular weight of about 3750.

References Cited

UNITED STATES PATENTS

| 2,977,242 | 3/1961 | Lederman et al. | 260—18 X |
| 2,759,901 | 8/1956 | Greenlee | 260—18 |
| 2,653,141 | 9/1953 | Greenlee | 260—18 |

(Other references on following page)

UNITED STATES PATENTS

2,963,378  12/1960  Palmquist et al. _____ 94—1.5 X
2,879,171  3/1959   Kullenberg _____ 94—1.5 XR
2,865,266  12/1958  Wynn _____ 94—1.5

OTHER REFERENCES

Canadian Paint and Varnish, 1960, vol. 34, No. 11 "What's Happening to Traffic Paints?" pp. 34, 35, 58, 59 and 61 to 63.

Canadian Paint and Varnish, 1960, vol. 34, No. 12 "Coming the Battle of Traffic Paints" pp. 25, 26 and 41–44 (copy available in Science Library TP/934/C3).

DONALD E. CZAJA, *Primary Examiner.*

C. W. IVY, *Assistant Examiner.*